Figure 1:
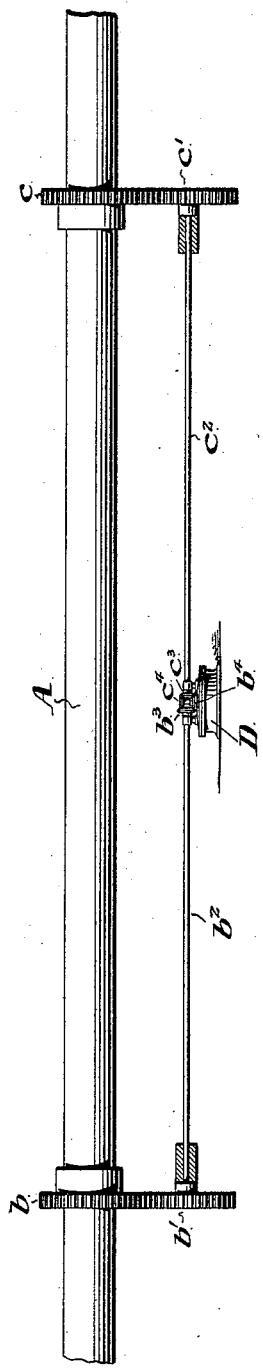

(No Model.) 8 Sheets—Sheet 2.

C. SELLERS.
ART OF AND APPARATUS FOR MEASURING POWER.

No. 565,303. Patented Aug. 4, 1896.

WITNESSES: INVENTOR:

(No Model.) 8 Sheets—Sheet 3.

C. SELLERS.
ART OF AND APPARATUS FOR MEASURING POWER.

No. 565,303. Patented Aug. 4, 1896.

WITNESSES:

INVENTOR:

(No Model.) 8 Sheets—Sheet 4.
C. SELLERS.
ART OF AND APPARATUS FOR MEASURING POWER.
No. 565,303. Patented Aug. 4, 1896.

WITNESSES:
INVENTOR:

(No Model.) 8 Sheets—Sheet 5.

C. SELLERS.
ART OF AND APPARATUS FOR MEASURING POWER.

No. 565,303. Patented Aug. 4, 1896.

WITNESSES: INVENTOR:

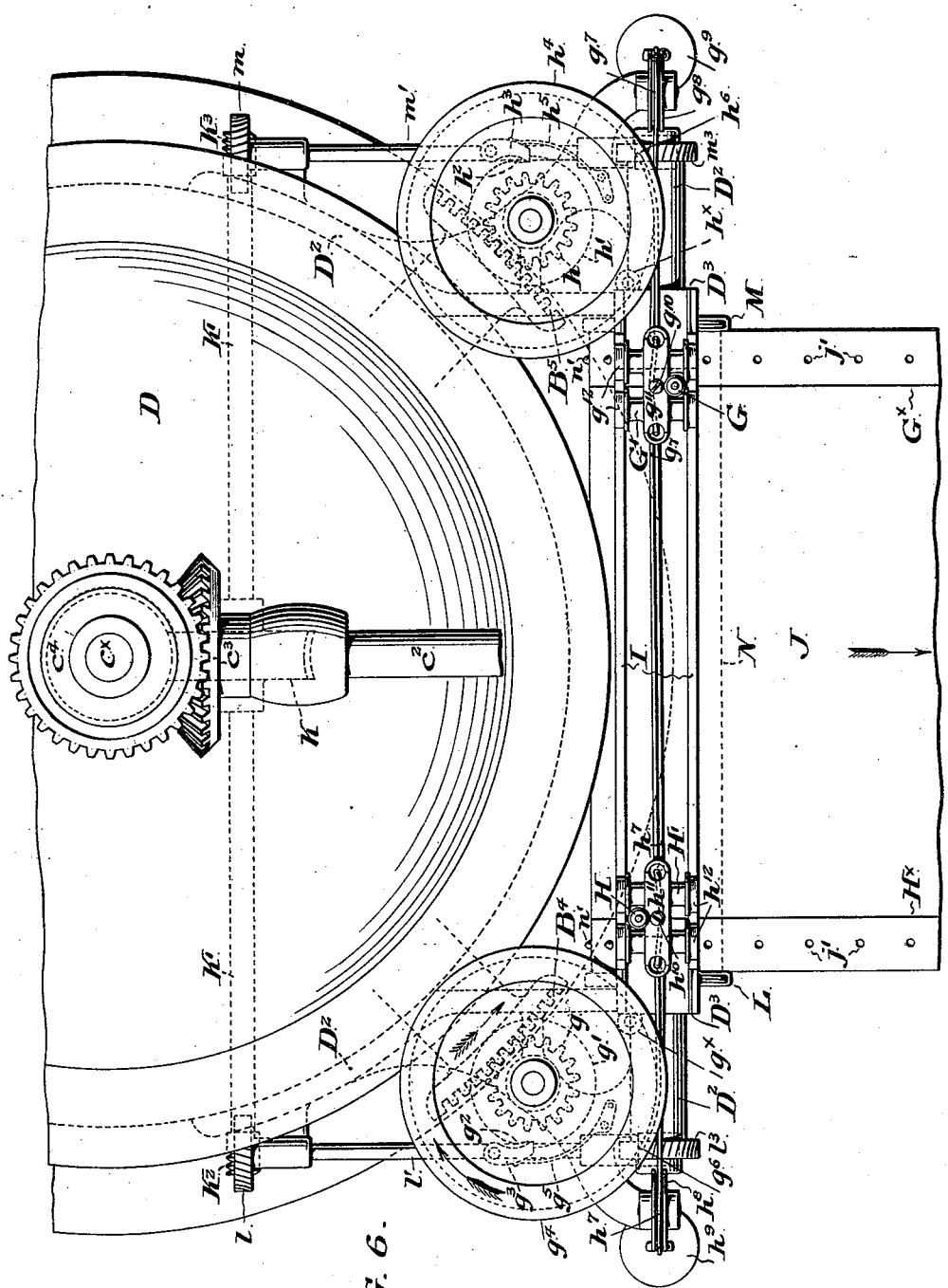

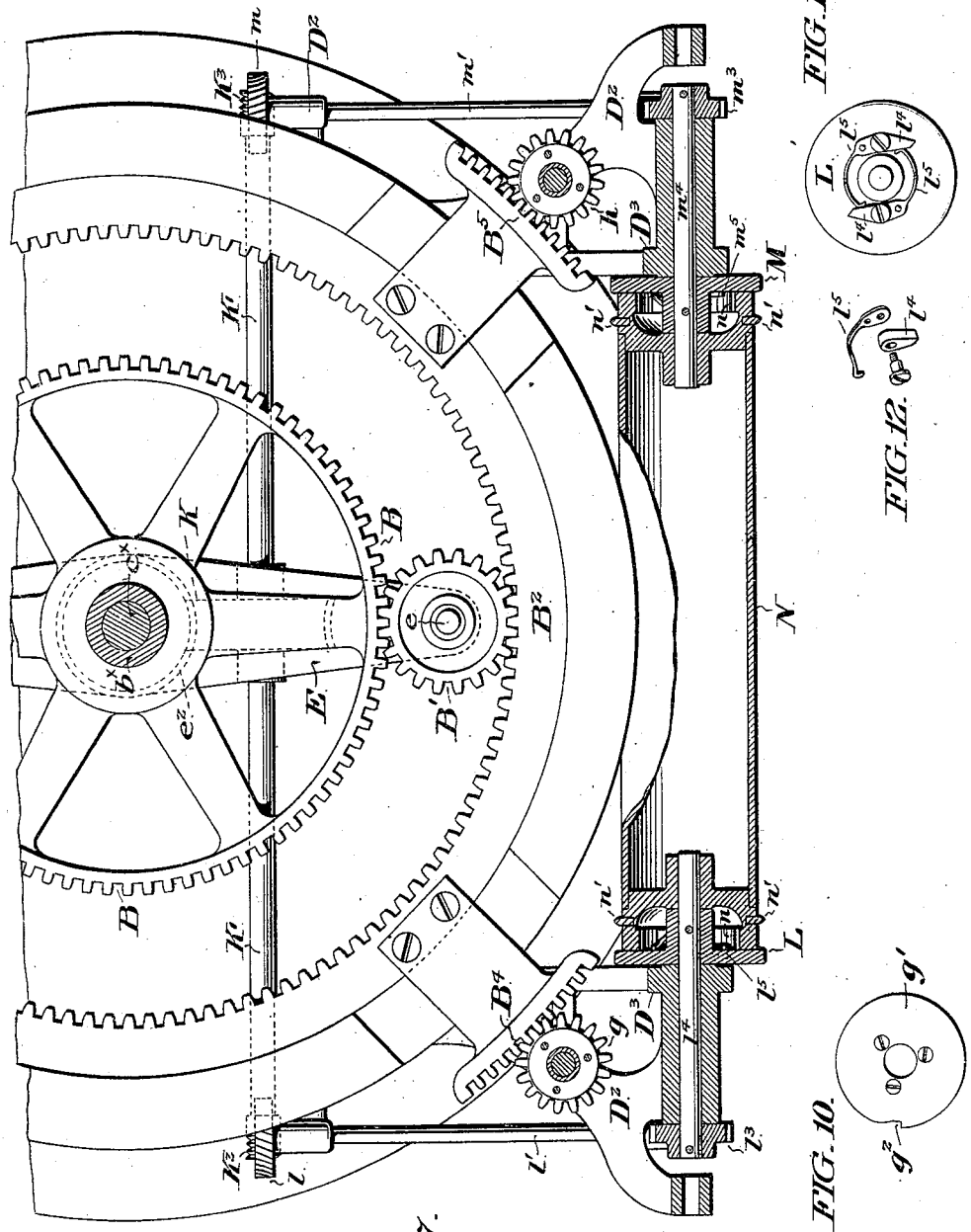

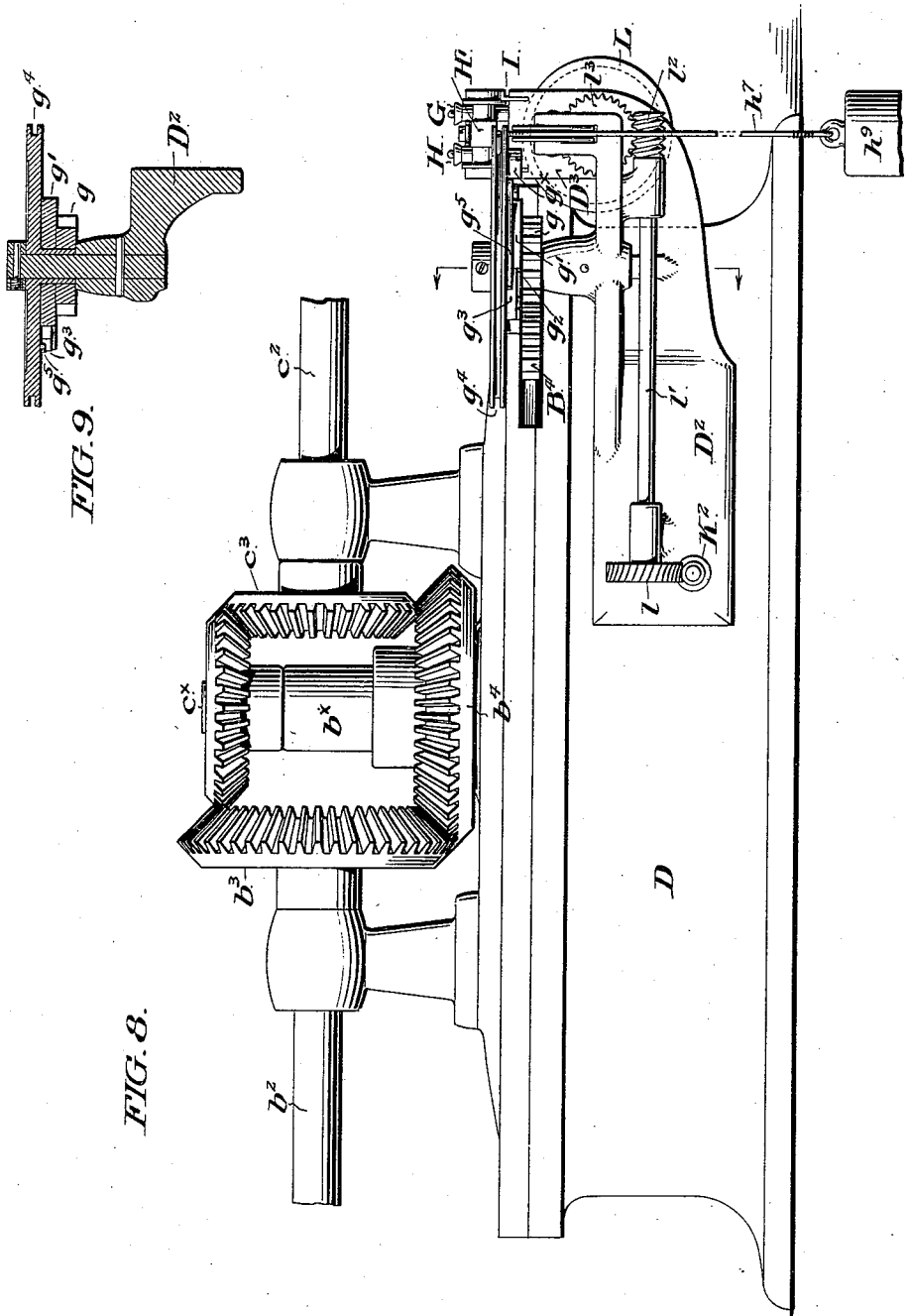

UNITED STATES PATENT OFFICE.

COLEMAN SELLERS, OF PHILADELPHIA, PENNSYLVANIA, ASSIGNOR TO THE CATARACT CONSTRUCTION COMPANY, OF NEW JERSEY.

ART OF AND APPARATUS FOR MEASURING POWER.

SPECIFICATION forming part of Letters Patent No. 565,30?, dated August 4, 1896.

Application filed January 11, 1896. Serial No. 575,092. (No model.)

*To all whom it may concern:*

Be it known that I, COLEMAN SELLERS, of Philadelphia, in the State of Pennsylvania, have invented certain new and useful Improvements in the Art of and Apparatus for Measuring Power, whereof the following is a specification, reference being had to the accompanying drawings.

The object of my invention is to measure the power transmitted by a rotating element at any instant and at any speed of revolution, the data being derived from torsional displacement of one portion of said element with relation to another portion thereof.

As the most obvious type of a rotating element, capable of torsional displacement and resilient thereunder, is a shaft, I will proceed to describe my invention by reference to such embodiment.

Broadly speaking, my invention thus embodied consists in arbitrarily selecting a given length from the total extent of said shaft, placing gears, or other means of deriving motion, at the two limits of said length, (hereinafter termed the "two actuating-points,") and independently transmitting the rotary movements of said actuating-points to respective rotary elements of a metrical group so organized that the resultant of differential rotation of said two actuating-points (due to the torsional displacement of one actuating-point with relation to the other) shall be manifested by definite movement of an indicating element comprised in said group.

In the preferred embodiment of said metrical group, hereinafter described in detail, the planetary or traveling elements of two definitely-related epicyclic trains are the respective rotary elements referred to in the foregoing paragraph. Each train comprises a central spur-wheel, which will be designated as the "solar element," an internally-toothed circular rack, concentric with such spur-wheel and designated the "orbital element," and an intermediate pinion meshing with both, which pinion is designated as the "planetary element." The solar and orbital elements of said trains are independent, but the axes of the planetary elements are interconnected, so that said planetary elements, while independently rotatable upon their individual axes, must progress orbitally in constant relation to each other. One of said trains comprises a fixed member, gearing with the planetary element thereof, while a corresponding member of the other train is free to be shifted by the differential rotation of its planetary element as compared with the rotation of the first-named planetary element, such differential rotation being derived from, and occurring in accordance with, the degree of rotative angular displacement of one actuating-point in relation to the other. One of the orbital elements is preferably employed as the fixed member, and, by reason of such fixture, the differential individual rotation of the planetary elements, accompanied by their synchronous progression in their orbits, results in rotative shifting of the free orbital element.

My invention also comprehends certain details adapted to be advantageously used in connection with the main features, in order to facilitate the recording of the data derived therefrom.

Figure 2:
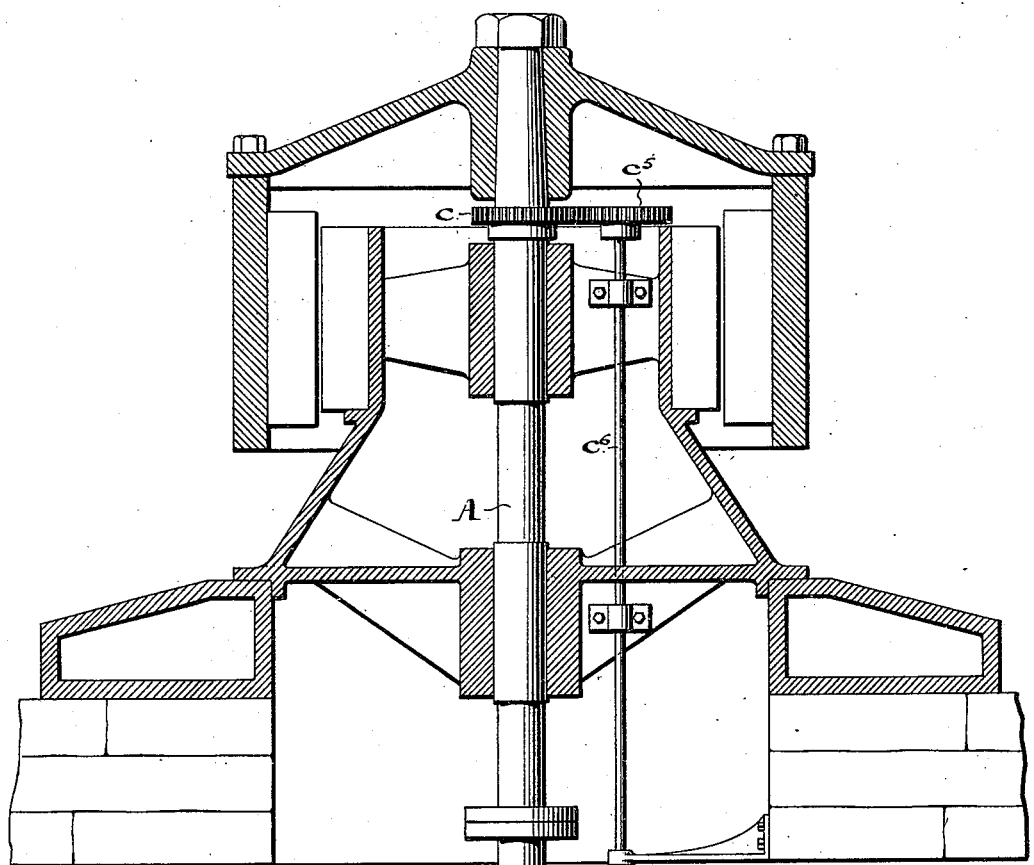
Figure 3:
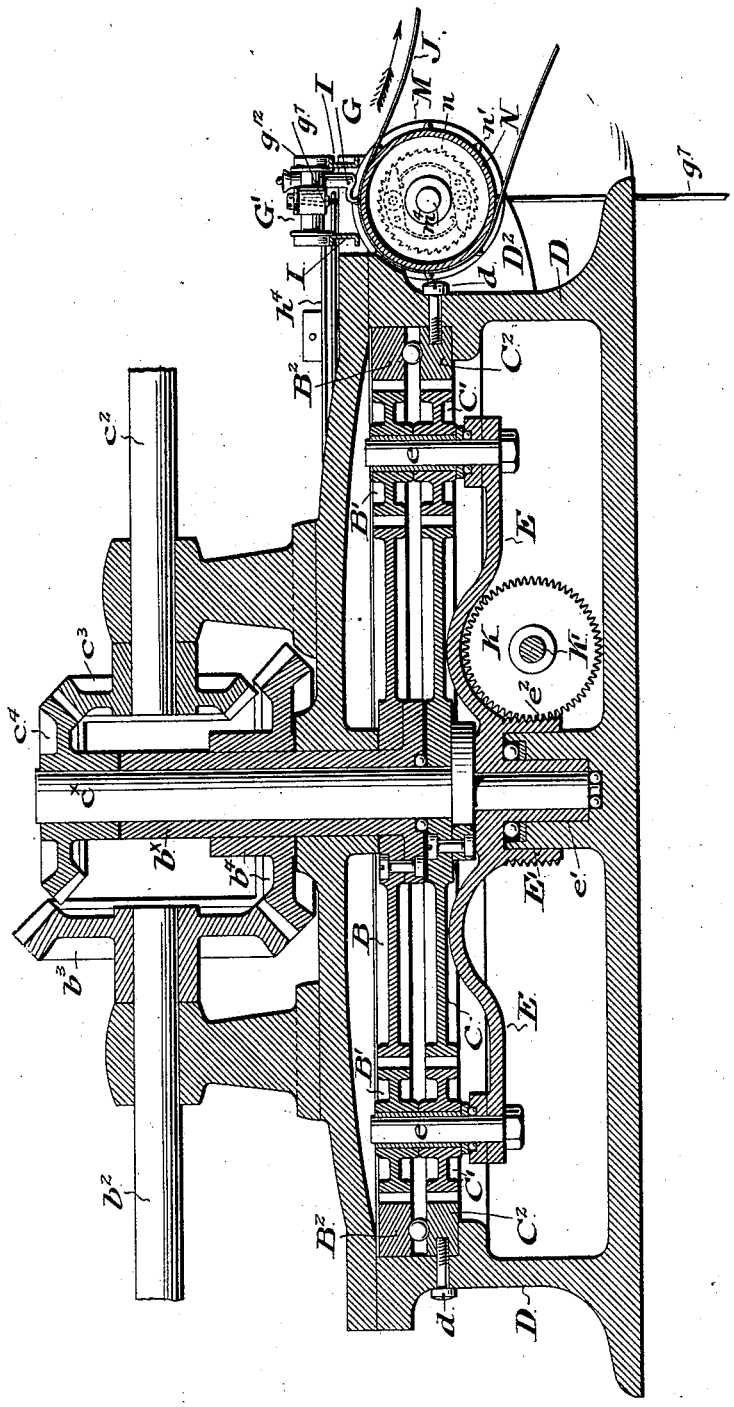
Figure 4:
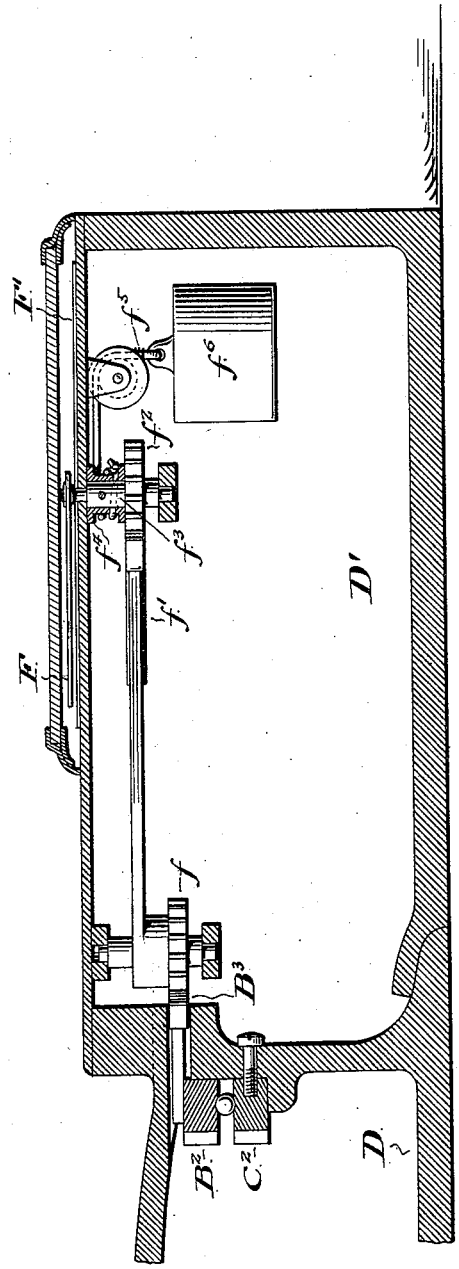
Figure 5:
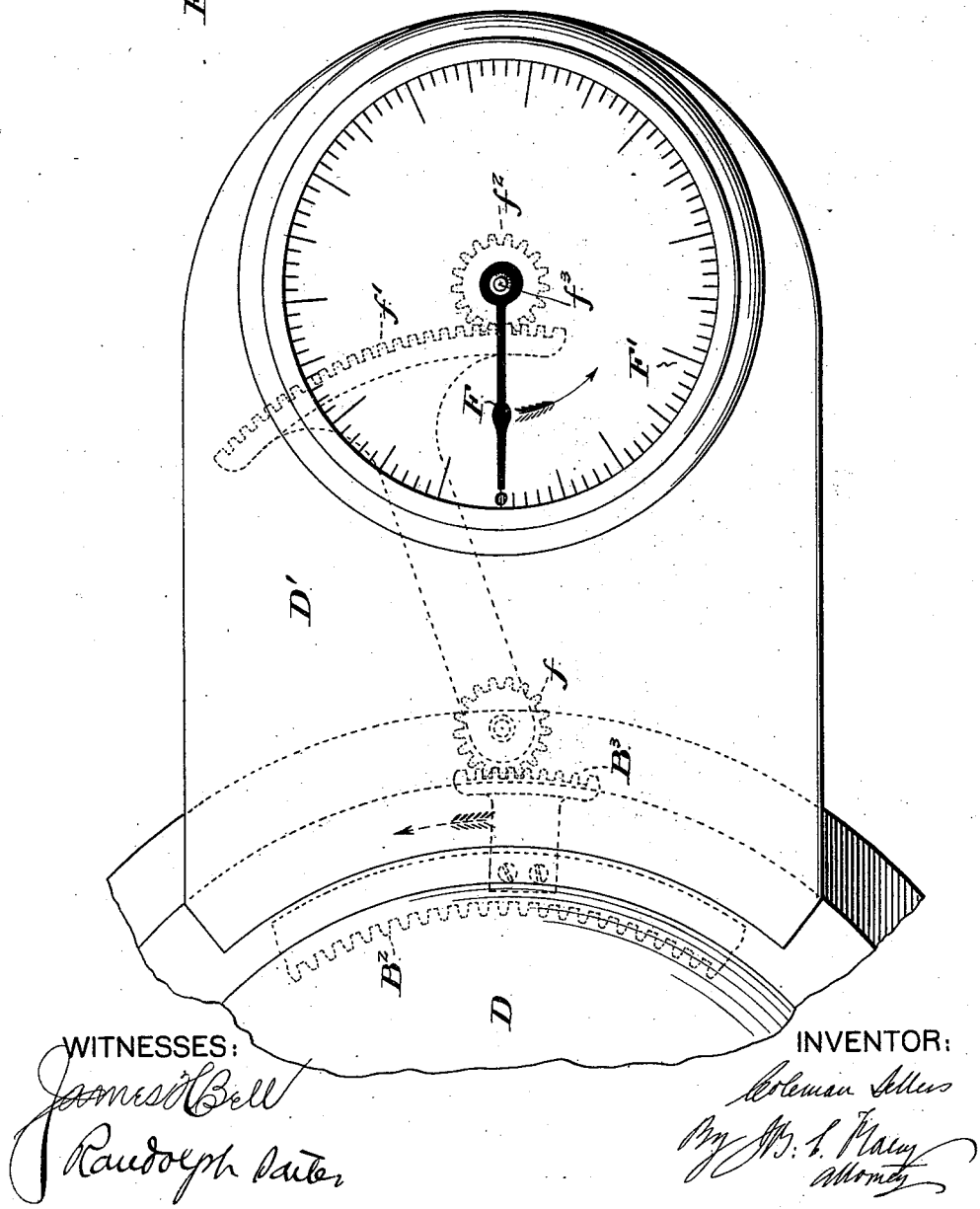

In the drawings, Figure 1 is an elevation of a horizontal shaft with my invention applied thereto. Fig. 2 is a similar view showing the application of my invention to a vertical shaft. Fig. 3 is a central vertical section through a casing containing two epicyclic trains and associated parts. Fig. 4 is a similar but partial section of said casing and trains, showing the addition thereto of a movable index and suitable connective multiplying-gearing. Fig. 5 is a plan view of the mechanism shown in Fig. 4. Fig. 6 is a plan view of Fig. 3, showing mechanism for continuously recording the data obtained. Fig. 7 is a plan sectional view of Fig. 3, the cover of the casing and certain other parts being removed. Fig. 8 is a side elevation of the mechanism shown in Fig. 6. Figs. 9, 10, 11, and 12 are detail views of certain parts of the recording mechanism.

In the convenient embodiment of my invention shown in said figures the shaft A of Figs. 1 and 2 is the revolving element from which said dynamometric data is obtained in the manner hereinbefore described. The two selected actuating-points upon said shaft A are provided with gears *b c*, respectively. By said gears independent rotary motion is communicated to the respective solar gear elements B C of two epicyclic trains mounted in the casing D, and shown in section in Fig. 3. In Fig. 1 said communication is had from gear $b$ to the solar element B through the gear $b'$, counter-shaft $b^2$, and bevel-gears $b^3$ $b^4$, the latter being fixedly mounted upon the hollow shaft $b^×$, secured to said member B. (See Fig. 3.) Communication is had from gear $c$ to solar member C through gear $c'$, counter-shaft $c^2$, and bevel-gears $c^3$ $c^4$, the latter being fixedly mounted upon the shaft $c^×$, secured to said member C.

The precise means of communication from the actuating-points $b$ and $c$ to the respective epicyclic trains is not of the essence of my invention. It is, however, essential that the rotary motion received by the two said trains shall be exactly proportional to the rotary motion of the respective actuating-points $b$ and $c$. Fig. 2 shows modified means by which such communication is obtained. Therein the gear $b$ engages with a gear $b^5$, mounted directly upon the hollow shaft $b^×$, and the gear $c$ engages with a gear $c^5$ upon a shaft $c^6$, which is directly coupled to the shaft $c^×$.

The solar elements B and C are mounted for independent rotation within the casing D. As shown in Fig. 3, the solar element B engages with the planetary elements B' B', and the solar element C engages with the planetary elements C' C'. The planetary elements of both trains are independently rotatable upon their individual axes, but must progress orbitally in constant relation to each other, and are therefore conveniently mounted upon common spindles $e$ $e$, fixed in the rotatable spider-frame E, which revolves freely in its journal $e'$ in the casing D. The planetary gear elements B' and C' engage with their respective orbital gear elements B² and C². The orbital gear C² is secured against rotation in the casing D by the screws $d$, but the orbital gear B² is free to rotate therein. If therefore the planetary gears C' are held by the solar gear C while the solar gear B is rotatively shifted in its relation to the solar gear C, said differential rotative movement is transmitted by the planetary gears B' B' to the loose orbital gear B², and said orbital gear B² is rotatively shifted the exact distance that the solar gear B has been shifted in its relation to the solar gear C. Such movement occurs when the shaft A twists under the application of power and resistance at its respective ends, the exact amount of its angle of torsion between the two actuating-points being transmitted by the respective gears $b$ and $c$ to the solar gears B and C, as described. Thus the apparatus may be conveniently calibrated from the shaft A in a position of rest to the maximum torsion of said shaft.

Furthermore, the above-described differential rotation may occur and be exactly indicated by the loose orbital gear B² while the shaft A is rotating at any speed, for the reason that the orbital position of the planetary gears C' and spindles $e$, at any instant, is absolutely determined by the position of the solar gear C, as its rotation causes the rotative progression of the planetary gears C' within their fixed orbital gear C² at a proportional rate dependent upon the ratio of their diameter to the diameter of said solar gear C. When therefore the solar gear B rotates at any speed in exact correspondence with the solar gear C, the planetary gears B' roll idly within their loose orbital gear B in exact synchronism with the planetary gears C', by which their spindles $e$ are orbitally progressed, and the loose orbital gear B² remains stationary by reason of its own inertia. If, however, there is any differential rotation of said gears, it is exactly manifested in the movement of the loose orbital gear B².

It is desirable for purposes of observation to magnify the resulting extent of movement of the loose element B². I have shown in Figs. 4 and 5 multiplying-gearing connecting said element B² with an index F, adapted to traverse a graduated dial F', mounted in a supplementary casing D'. Said connection is effected by external gear-teeth B³ upon the element B² engaging with the gear $f$, the sector $f'$, secured thereto, being engaged with a gear $f^2$ upon the index-arbor $f^3$. A drum $f^4$, secured upon arbor $f^3$, is connected by the cord $f^5$ with a depending weight $f^6$, whereby the above-described gears are kept in intimate engagement, thus preventing any error from their backlash.

It is obvious that the dial F' may be graduated to represent degrees of torsion of the shaft A, or its graduations may represent units of power transmitted by said shaft.

In the simple form indicated in Figs. 4 and 5 the parts are adapted for but one direction of rotation of shaft A. The index, having been set at zero-point when the shaft A is at rest, shifts in the direction of the arrow and returns, in accordance with the respective increase and decrease of the torsion of said shaft.

It is obvious that when the index is desired to indicate from both directions of rotation of the shaft A the sector $f'$ may be enlarged and the graduations of the dial F' extend in both directions from the zero-point. Of course in both of said forms the index F shifts with every change in the amount of power or resistance applied to the shaft A. It is desirable in some instances to have a record of said changes. I have shown in Figs. 3, 6, 7, 8, 9, 10, 11, and 12 means for making a continuous, removable record of said changes, the construction of the parts, as hereinafter explained, being such that the direction of rotation of the shaft A may be reversed without interrupting the continuity of said record. In this form connection is made from external gear-teeth B⁴ and B⁵ upon the orbital elements B² to two pens G and H, respectively, adapted to form a line upon a strip of paper fed beneath them. Since one or the other of said pens is idle, according as shaft A rotates in one direction or the other, I shall simply describe the connective mechanism of pen G and correspondingly letter upon the drawings the similar parts pertaining to pen H.

Conveniently mounted for rotation upon a bracket $D^2$, secured to the casing D, is a gear-wheel $g$, secured to a disk $g'$, of greater diameter, so as to form a circumferentially-projecting flange, in which is a single notch $g^2$. A pawl $g^3$ is pivoted upon the grooved cord-wheel $g^4$ and provided with a spring $g^5$, adapted to press said pawl into engagement with the notch $g^2$. At the point $g^6$ a cord $g^7$ is secured to the wheel $g^4$ and passes thence beneath the pen-carriage H′ to the pen-carriage G′, thence beneath the cord-wheel $h^4$, over the guide-roller $g^8$, to a depending weight $g^9$. The pen-carriage G′ is secured to the cord $g^7$ by a screw $g^{10}$ and clamp-plate $g^{11}$. The wheels $g^{12}$ support said carriage upon tracks I, mounted upon the brackets $D^2$.

As shown in the drawings, the parts are in a position corresponding with the position of rest of the shaft A. In said position (see Fig. 6) the stop $g^\times$ upon the cord-wheel $g^4$ is held against the abutment $D^3$ of the bracket $D^2$ by the depending weight $g^9$. The pawl $g^3$ is engaged by the notch $g^2$ of the gear $g$, and the point of the pen G is held on the zero-line $G^\times$ of the paper strip J. If the shaft A rotates in the direction to bring the other pen, H, into action, the gear $g$ rotates idly, carrying its notch $g^2$ out of engagement with the pawl $g^3$, the wheel $g^4$, cord $g^7$, and pen G remaining stationary. If, however, the shaft A rotates in the converse direction, the orbital gear $B^2$ and teeth $B^4$ will be moved in correspondence therewith, as indicated by the arrow in Fig. 6. The gear $g$ by engagement of its notch $g^2$ with the pawl $g^3$ rotates the cord-wheel $g^4$ in the direction of the arrow marked upon it, making a corresponding line with the pen G upon the paper strip J. As the shaft A ceases to rotate in a given direction the pen which has been in operation retreats simultaneously to its zero-line. If, after coming to rest, the shaft A begins to rotate in the opposite direction, the opposite pen advances and continues the record.

To make a proper record of the various movements of the pens upon the paper J, it is necessary to feed it beneath the pens at a rate proportionate to the speed of the shaft A. I effect the said movement of the paper J as follows: A worm-thread $e'$ is cut upon a central hub E′, formed upon the spider-frame E, which is rotated by the planetary gears. Said worm engages with a worm-gear K upon the shaft K′, which is journaled in the brackets $D^2$ and provided with oppositely-inclined worms $K^2$ $K^3$. The worm $K^2$ engages with a worm-gear $l$ upon a shaft $l'$, which is provided at its opposite end with a worm $l^2$. The worm $l^2$ engages with a worm-gear $l^3$ upon a shaft $l^4$, upon which is also secured a pawl-disk L. The rotary motion of the worm $K^3$ is transmitted through corresponding parts, (marked $m$, &c.,) terminating in a pawl-disk M, secured upon a shaft $m^4$. The shafts $l^4$ and $m^4$ are in line, and mounted for free rotation upon their inner ends is the paper-drum N. Said drum is provided at each end with a ratchet $n$, the teeth of both of said ratchets being inclined, as shown in dotted lines in Fig. 3. The pawl-disk L is provided with pawls $l^4$ and springs $l^5$, adapted to press said pawls into engagement with the ratchet $n$, to which they are opposed. The disk M is similarly provided with pawls $m^4$ and springs $m^5$. The pawls $l^4$ and $m^4$ are both inclined, as indicated by the dotted lines of Fig. 3.

Owing to the opposite inclination of the worms $K^2$ and $K^3$ the pawl-disks L and M must rotate in opposite directions, and therefore the paper-drum N will always be rotated in the direction of the arrow seen in Fig. 3 by the engagement of one or the other of said disks L and M, according to the direction of rotation of the shaft A.

The movement of the drum N is positively imparted to the paper strip J by the engagement of the pin-teeth $n'$ of said drum with the perforations $j$ of said strip.

It is obvious that, if desired, indications of periods of time may also be imprinted upon said strip J by a simple clock-controlled mechanism.

It is to be observed that while I have shown and described the actuation of the respective rotary elements of the metrical group from two points, separated from each other by a considerable length of the resilient shaft A, I do not limit myself to the use of a shaft as the torsional element.

It is obvious that other modifications may be made therein without departing from the spirit of my invention. I therefore do not desire to limit myself to the precise arrangement or construction of the parts shown and described, but

I claim—

1. The hereinbefore-described improvement in the art of measuring power, which consists in deriving independent rotary movements from two actuating-points of a rotating element, said two actuating-points being capable of torsional displacement relatively to one another; transmitting the rotary movements of said actuating-points to respective rotary elements of a metrical group; and resolving the differential rotation of said elements into definite movement of an indicating element comprised in said group, substantially as set forth.

2. The combination of a rotating element, capable of torsional displacement and resilient thereunder; means substantially as set forth for deriving motion from two independent actuating-points thereon; two definitely-related epicyclic trains, substantially as set forth, one of said trains comprising an indicating element movable by differential rotation of the respective planetary elements; and means substantially as set forth for independently transmitting the rotary movements of the respective actuating-points to corresponding elements of said trains.

3. In a metrical group, the combination of two definitely-related epicyclic trains, the planetary or traveling elements of which are independently rotatable upon their individual axes, said axes being interconnected so as to progress orbitally in constant relation to each other, the solar elements of said trains being independently rotatable, the orbital element of one of said trains being fixed and the orbital element of the other train being an indicating element movable by differential rotation of said planetary elements, substantially as set forth.

4. In a metrical group, two independent rotary elements; an indicating element movable by differential rotation of said independent rotary elements; an inscribing-index actuated by the movement of said indicating element; and means definitely related to said indicating element whereby the fabric adapted to receive inscriptions from the said index may be caused to traverse in a single direction in proper relation to said index, irrespective of the direction of movement of the said indicating element, substantially as set forth.

5. In a metrical group, the combination of two definitely-related epicyclic trains, the planetary or traveling elements of which are independently rotatable upon their individual axes, said axes being interconnected so as to progress orbitally in constant relation to each other, the solar and orbital elements of said trains being independent, and one of said trains comprising a fixed element, while the corresponding element of the other train is movable by differential rotation of said planetary elements, substantially as set forth.

COLEMAN SELLERS.

Witnesses:
JAMES H. BELL,
RANDOLPH SATLER.